UNITED STATES PATENT OFFICE.

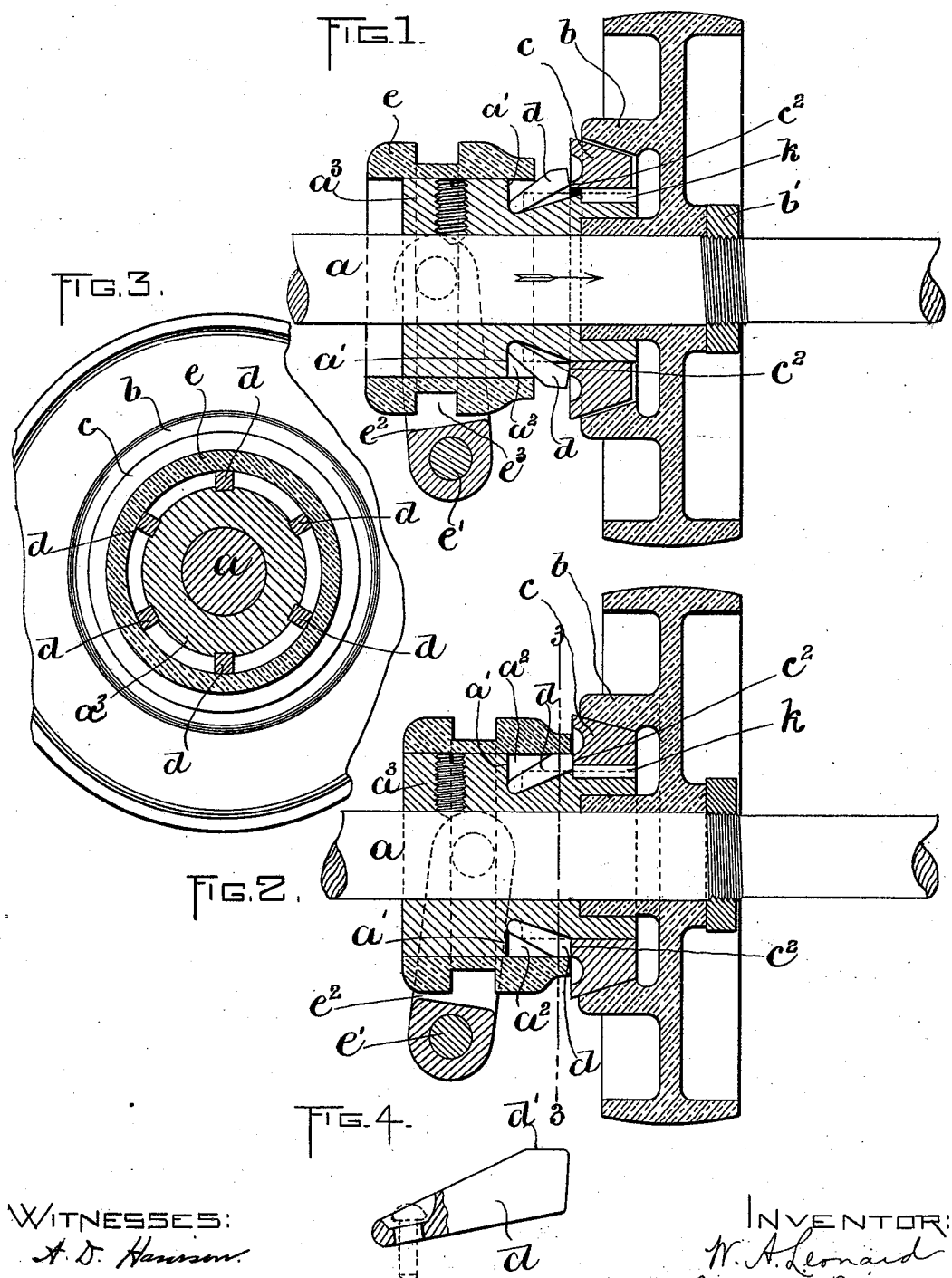

WILBUR A. LEONARD, OF SPRINGFIELD, VERMONT.

FRICTION-CLUTCH.

SPECIFICATION forming part of Letters Patent No. 551,213, dated December 10, 1895.

Application filed June 11, 1895. Serial No. 552,427. (No model.)

*To all whom it may concern:*

Be it known that I, WILBUR A. LEONARD, of Springfield, in the county of Windsor and State of Vermont, have invented certain new and useful Improvements in Friction-Clutches, of which the following is a specification.

This invention relates to a friction-clutch in which one clutch member is rotatively engaged with and adapted to slide endwise upon a shaft or spindle into and out of contact with the other clutch member, which is loosely mounted upon the shaft and is prevented from moving endwise thereon.

The invention has for its object to provide simple, durable, and effective means for operatively connecting the two members and providing for the automatic release of the sliding member when it is desired to make the clutch inoperative.

The novel feature of the invention is a series of struts seated upon thrust bearings or seats upon the shaft or spindle and upon corresponding bearings or seats on the sliding clutch member, said struts being inclined so that their outer ends may be caused to operatively engage the clutch members by an inward movement of their outer ends, and will automatically release the sliding clutch member when the operating pressure is removed.

Of the accompanying drawings, forming a part of this specification, Figure 1 represents a sectional elevation of my improved clutch mechanism, showing the clutch members separated. Fig. 2 is a similar view showing the clutch members operatively connected. Fig. 3 represents a section on line 3 3 of Fig. 2. Fig. 4 represents a view of one of the struts detached.

The same letters of reference indicate the same parts in all the figures.

In the drawings, $a$ represents a shaft or spindle having a series of thrust-bearings or strut-seats $a'$, which as here shown are the inner ends of slots or pockets $a^2$, formed in a collar $a^3$, which is rigidly affixed to the shaft, the said pockets having inclined bottoms, as shown.

$b$ represents the loose clutch member, which, while loosely mounted upon the shaft $a$, is prevented from moving endwise thereon by any suitable means, such as a collar $b'$ secured to the shaft and bearing against one end of the member $b$.

$c$ represents the sliding clutch member, which is rotatively engaged with the shaft $a$ and is at the same time adapted to move endwise or longitudinally of the shaft into and out of engagement with the clutch member $b$.

The means for connecting the member $c$ with the shaft in the manner described may be of the ordinary character well known in friction-clutches, such as a key or rib $k$ on the collar $a^3$ and a corresponding groove in the sliding clutch member. The sliding member $c$ is formed to present a strut seat or bearing $c^2$, which is located outside the circle of the series of thrust-bearings or strut-seats $a'$. In other words, the portion of the clutch member $c$ on which the strut-seat $c^2$ is formed is of greater diameter than the collar $a^4$ on which the thrust-bearings or strut-seats $a'$ are formed, so that the struts hereinafter mentioned extending from the bearings or seats $a'$ to the seat $c^2$ will be inclined relatively to the axis of the shaft, their ends which bear upon the clutch member $c$ being farther from said axis than their ends which bear upon the collar $a^3$. I have here shown the strut-seat $c^2$ on the clutch member $c$ as an annular face formed on said clutch member; but I do not confine myself to this construction, as the struts may bear upon a series of independent seats on or connected with the sliding clutch member.

For the sake of convenience I term the portions of the sliding clutch member on which the struts bear "strut-seats," whether they are independent surfaces separated from each other by intervening material, or parts of a continuous surface.

$d$ $d$ represent a series of struts, which are formed to bear simultaneously upon the thrust bearings or seats $a'$ on the spindle and the corresponding seats $c^2$ on the sliding clutch member, said struts being caused by the described location of the seats $c^2$ outside the circle of the seats $a'$ to stand in inclined positions relatively to the axis of the shaft, their outer ends bearing upon the seats $c^2$. This arrangement of the struts not only enables them to be simultaneously forced inward at their outer ends, and thereby move the sliding member $c$ into engagement with the loose member $b$, but also enables the struts to automatically yield outwardly, and thus release the sliding member $c$ when the clutch-connecting force or pressure is removed. The struts may be forced inwardly at their outer ends by means of a sliding sleeve $e$, which is formed to bear upon the inclined outer edges of the struts when the clutch members are disconnected, as shown in Fig. 1, said sleeve when moved in the direction indicated by the arrow in Fig. 1 forcing the outer ends of the struts inwardly and thus moving the clutch member $c$ in the same direction, engaging the latter with the clutch-member $b$, as shown in Fig. 2. The sleeve $e$ may be moved back and forth by any suitable means, such as a rock-shaft $e'$, journaled in bearings adjacent to the shaft $a$, and an arm or arms $e^2$, affixed to said rock-shaft and engaged with a groove $e^3$ in the sleeve. The struts are provided at their outer portions with flat faces $d'$, which form an angle with the main portions of the outer edges of the struts and are arranged so that when the struts are forced inwardly, as shown in Fig. 2, said faces $d'$ are parallel with the shaft and therefore bear upon the inner surface of the sleeve $e$, so that the sleeve and struts will be held in the position shown in Fig. 2 by the co-operation of the faces $d'$ and the inner surface of the sleeve $e$. When the sleeve $e$ is moved back to the position shown in Fig. 1, it leaves the faces $d'$ and releases the struts, their relative arrangement causing them to yield outwardly to the tendency of the member $c$ to recede from operative contact with the member $b$, so that the struts may be said to automatically release the sliding clutch member.

The angle at which the struts stand with respect to the face of the clutch member which forms the seats is not a "sticking" angle, but is such as to insure the release of the clutch when the sleeve $e$ is retracted. No spring is necessary to separate the clutch-members, for there is always considerable jarring accompanying the operation of machinery, and this will prevent the members sticking together after the struts are released.

It will be seen that the described mechanism is extremely simple and effective and is not liable to get out of order, the described arrangement of the struts enabling them to be operated by a device of the simplest character—namely, a sleeve or ring having a plain cylindrical inner surface.

It is obvious that I may apply my above-described improvement to a mechanism in which there are two sets of clutch members and two sets of struts, as shown in my application for Letters Patent of the United States for improvements in lathe-heads, filed January 10, 1895, Serial No. 534,427, said application showing the combination of parts which constitutes the subject-matter of the present application, but being confined to the specific application of said improvements to a lathe-head. I elect, however, in the present application to claim said improvements more broadly, and cover their general application to friction-clutches for all purposes to which they are applicable.

It is obvious that the strut-seats or thrust-bearings $a'$ may be formed directly in the spindle $a$, in which case the sleeve $a^3$ will not be required.

I claim—

1. In a friction-clutch, the combination of a shaft or spindle having a series of endwise-facing strut-seats or thrust-bearings, two clutch-members on said shaft one of said members being rotatively engaged with the shaft and the other loose thereon, a series of struts interposed between the said seats on the shaft and corresponding seats on one of the clutch-members facing the shaft-seats but circumferentially outside of the same, the struts being disposed with their ends in contact with the seats but always held in an inclined position by said seats, and means for forcing the outer ends of the struts inwardly to operatively connect the clutch-members by endwise pressure of the struts against the seats, the struts being caused by their inclined position to yield outwardly when released and permit the separation of the clutch-members, substantially as described.

2. In a friction-clutch, the combination of a shaft or spindle having a series of endwise-facing strut-seats or thrust-bearings, a sliding clutch-member rotatively connected with the shaft and provided with strut-seats facing those of the shaft but located circumferentially outside the same, a clutch-member loose upon the shaft and supported against endwise movement thereon, a series of struts interposed between the seats on the spindle and sliding clutch-member with their ends in contact with said seats, said struts being held in an inclined position thereby and each strut having an outer or back surface to come substantially parallel with the shaft when the struts are moved to locking position, and a sleeve formed to embrace the series of struts and to co-operate with their inclined outer edges in forcing the outer ends of the struts inward and to engage the back surfaces in holding the struts in locking position, substantially as described.

3. In a friction-clutch, the combination of a shaft or spindle, a collar affixed thereto and having a series of slots or pockets terminating at one end in strut-seats or thrust-bearings and having inclined bottoms, a sliding clutch-member rotatively connected with the shaft and provided with strut-seats located opposite but circumferentially outside the seats or bearings in the collar, a clutch-member loose upon the shaft and supported against endwise movement thereon, a series of inclined struts interposed between the said seats with their ends bearing against the same, and a sliding sleeve adapted to force the outer ends of said struts inwardly and thereby operatively connect the clutch-members by endwise pressure of the struts against the seats, the inclined position maintained by the struts permitting their automatic release when the said sliding sleeve is retracted, substantially as described.

In testimony whereof I have signed my name to this specification, in the presence of two subscribing witnesses, this 18th day of May, A. D. 1895.

WILBUR A. LEONARD.

Witnesses:
   JEROME W. PIERCE,
   ALICE M. WHEELER.